Sept. 2, 1969   J. C. RENTZ   3,464,864
BUTTON FOR HOLDING THERMOCOUPLES TO THE SKIN
SURFACE OF SUBJECTS
Filed June 4, 1968

INVENTOR.
John C. Rentz
BY: Harry M. Saragovitz,
Edward J. Kelly &
Herbert Berl
ATTORNEY

United States Patent Office 3,464,864
Patented Sept. 2, 1969

3,464,864
BUTTON FOR HOLDING THERMOCOUPLES TO THE SKIN SURFACE OF SUBJECTS
John C. Rentz, Abingdon, Md., assignor to the United States of America as represented by the Secretary of the Army
Filed June 4, 1968, Ser. No. 734,283
Int. Cl. H01v 1/02
U.S. Cl. 136—221　　　　　　　　　　　　7 Claims

ABSTRACT OF THE DISCLOSURE

A thermocouple support having a disc-shaped head and base at opposite sides of a unitary structure. The thermocouple is positioned at the bottom of the base. An elastic band encircles the body to be measured and both ends of the band are hooked over the head of the support, pressing the support and thermocouple against the body.

DEDICATORY CLAUSE

The invention described herein may be manufactured, used, and licensed by or for the Government for governmental purposes without the payment to me of any royalty thereon.

SPECIFICATION

My invention relates to a thermocouple support to be utilized to maintain a thermocople in good thermal contact with the skin surface of an animal.

It is frequently necessary to monitor the skin surface temperature of animals, including humans, to ascertain the effects produced by drugs introduced into the body system, exposure to certain air polluted environments, etc. The prior art technique to monitor the skin temperature was to adhesively tape the junction of the thermocouple to an animal body member, such as a leg, and connect the other extremity of the thermocouple to a conventional graphic recording device. Such prior art technique presented disadvantages and problems such as the necessity to remove any hair from the animal body member to which the thermocouple junction was to be adhesively attached in order to avoid pulling of the hair by the adhesive, unstable anchoring of the thermocouple to the skin surface which resulted in the thermocouple junction being displaced out of contact with the skin surface or breaking of the junction through movement of the body member by the animal, and inefficient shielding of the thermocouple junction which led to erroneous temperature curves regarding the skin surface temperature being recorded. Accordingly, my invention was conceived and reduced to practice to overcome and solve the above disadvantages and problems.

A principal object of my invention is to provide a reliable thermocouple support means which can easily and quickly be attached to any animal body member.

A further object of my invention is to provide a reliable thermocouple support means which will maintain the thermocouple junction in contact with the skin surface of the animal body member which is being monitored for temperature variation and which will avoid breaking of the thermocouple junction irrespective of any body member movement.

Another object of my invention is to provide a reliable thermocouple support means which efficiently shields the thermocouple junction and permits recordation of a true temperature fluctuation curve.

Other objects of my invention will be obvious or will appear from the specification hereinafter set forth.

Figure 1:
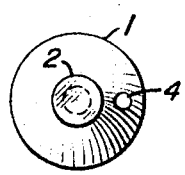
FIGURE 1 is a plan view of my thermocouple support.
Figure 3:
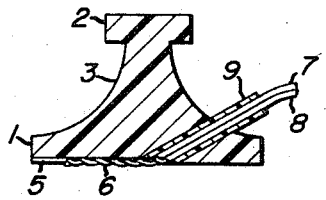
FIGURE 3 is a sectional view of my thermocouple support with a thermocouple mounted therein.
Figure 2:
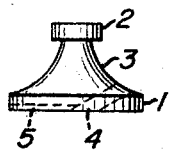
FIGURE 2 is an elevation view of my thermocouple support.
Figure 4:
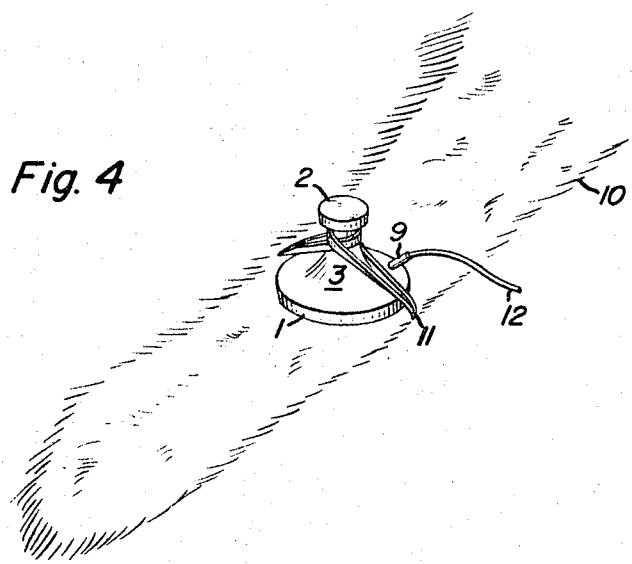
FIGURE 4 is a view of my thermocouple support mounted on an animal body member.

My invention and FIGURES 1 to 4 will now be described in detail as follows:

My thermocouple support is constructed of any convenient material such as a rigid plastic, and it can be either machine manufactured or molded from materials such as Plexiglas, Lucite, Teflon, various phenolics, etc. My structure comprises a base 1 connected to a head 2 through means of a neck portion 3. A hole 4 of any suitable diameter, which depends on the size of the thermocouple to be utilized therewith, is drilled at an angle of approximately 45° through neck 3 into and through base 1. Channel 5 is formed in the bottom surface of base 1 and connects with hole 4, the channel being of such length as to accommodate the particular size of junction 6 of the thermocouple which consists of a conventional wire 7 and wire 8 low temperature couple such as a copper-constantan or iron-constantan couple. The channel 5 is formed of such depth as to permit the junction 6 being utilized to lie within the channel so that the outer surface of the junction is flush with the bottom of base 1. Wires 7 and 8 are inserted in any conventional thermal insulating jacket 9, such as a plastic jacket, either as individual wires as shown in FIGURE 3 or having the wires inclosed in a conventional temperature shielding jacket 12 as in FIGURE 4. Jacket 9 is mounted within hole 4 in any conventional manner such as by means of cement. The above described thermocouple support structure is utilized by placing the support on an animal's body member 10, as shown in FIGURE 4, placing one end of an elastic band 11 over head 2 and around neck 3, wrapping band 11 around body member 10, and placing the other end of band 11 over head 2 and around neck 3. Wires 7 and 8 are then connected to a recording device to record any temperature variation in body member 10 as a function of time. While the drawing shows structures 1 and 2 to be of disc configuration and structure 3 of arcuate configuration, it is well within the skill of the art to design the configuration of each of structures 1, 2, and 3 to suit one's individual requirements.

It is obvious that other modifications can be made of my invention.

I claim:

1. A system for sensing temperature in a body comprising a thermocouple means, and thermocouple support means, wherein the improvement in combination therewith is the support means comprising a head means, base means, neck means integral with and connecting said head and base means, hole means within said neck and base means, channel means within said base means adapted to contain a junction of said thermocouple means, means for mounting said thermocouple within said hole means, and means for mounting said support means on said body, wherein said mounting means is an elastic band which encircles said body and which has its two ends hooked over said head means.

2. The system of claim 1 wherein said head and base means have a disc configuration.

3. The system of claim 2 wherein the head means is of a smaller diameter than the base means.

4. The system of claim 1 wherein the neck means is of an arcuate configuration.

5. The system of claim 1 wherein the hole means is at an angle of approximately 45 degrees.

6. The system of claim 1 wherein said channel means is of a predetermined length to accommodate said junction.

7. The system of claim 6 wherein the channel means is of a predetermined depth adapted to permit said junction to be flush with the lower surface of said base means.

References Cited

UNITED STATES PATENTS

| | | | |
|---|---|---|---|
| 1,622,827 | 3/1927 | Smith | 136—230 XR |
| 3,258,969 | 7/1966 | Poirier | 73—359 XR |

FOREIGN PATENTS 560,829  10/1932  Germany.

OTHER REFERENCES

McConnell et al., Body Temperatures. In the Transactions of Am. So. of Heat.-Vent. Engineers, vol. 28, pp. 217–8, 1922.

LOUIS R. PRINCE, Primary Examiner

FREDERICK SHOON, Assistant Examiner

U.S. Cl. X.R.

73—359; 136—230